United States Patent [19]
Powell

[11] Patent Number: 5,956,694
[45] Date of Patent: Sep. 21, 1999

[54] SYSTEM AND METHOD FOR DISTRIBUTING AND PROCESSING DISCOUNT COUPONS

[76] Inventor: Ken R. Powell, P.O. Box 6265, Athens, Ga. 30604

[21] Appl. No.: 08/799,691

[22] Filed: Feb. 11, 1997

[51] Int. Cl.$^6$ .................................................. G06F 17/60
[52] U.S. Cl. ............................ 705/14; 235/383; 235/375
[58] Field of Search .............................. 705/14; 235/383, 235/375

[56] References Cited

U.S. PATENT DOCUMENTS

| | | | |
|---|---|---|---|
| 4,674,041 | 6/1987 | Lemon et al. ............................ | 705/14 |
| 4,882,675 | 11/1989 | Nichtberger et al. ...................... | 705/14 |
| 4,896,791 | 1/1990 | Smith ........................................ | 221/7 |
| 5,047,614 | 9/1991 | Bianco .................................... | 235/385 |
| 5,192,854 | 3/1993 | Counts .................................... | 235/375 |
| 5,249,044 | 9/1993 | Von Kohorn ............................. | 348/12 |
| 5,250,789 | 10/1993 | Johnsen ................................... | 235/383 |
| 5,471,669 | 11/1995 | Zlidman .................................. | 235/383 |

OTHER PUBLICATIONS

Fancher, Carol H., *Smart Cards,* Scientific American, Aug. 1996, pp. 40–45.
CDM400 Card Dispensing Machine, http://www.slb.com/et/card_dispensing_machine.ht, Dec. 1995.
Printout from www.slb.com/et/card_dispensing_machine.html, Copyright 1997, received via the World Wide Web on Jun. 16, 1998.

*Primary Examiner*—Edward R. Cosimano
*Assistant Examiner*—Raquel Alvarez
*Attorney, Agent, or Firm*—Jerome D. Jackson

[57] ABSTRACT

A system for dispensing and redeeming electronic discount coupons in a store. A card-dispensing collects information from a customer and subsequently issues a "smart card" for storing electronic coupons. Upon completion of shopping, the customer redeems the electronic coupons at the checkout area, by inserting the card into the checkout station. During checkout, when UPC product data corresponds to coupons stored on the card, the customer is credited with the value of the corresponding coupon.

8 Claims, 20 Drawing Sheets

30:  5 17031 268 45 8
     5 17054 235 76 5
     5 17075 278 30 7

8435

| CARD ID | BIRTHDATE | INCOME | HOUSEHOLD SIZE | CHILDREN IN HOUSEHOLD |
|---|---|---|---|---|
| [customer ID 1] | March 12, 1944 | 30,100 | 3 | 1 |
| [customer ID 2] | March 12, 1964 | 23,700 | 5 | 3 |
| [customer ID 3] | March 12, 1932 | 30,100 | 2 | 0 |
| [customer ID 4] | March 12, 1905 | 89,000 | 2 | 0 |
| ... | ... | ... | ... | ... |
| [customer ID n] | December 12, 1975 | 19,100 | 1 | 0 |

SYSTEM AND METHOD FOR DISTRIBUTING AND PROCESSING DISCOUNT COUPONS

BACKGROUND OF THE INVENTION

1. Field of the Invention

This invention relates generally to an electronic retail system and, more particularly, to a system and method for distributing and processing discount coupons.

2. Description of Related Art

Discount coupons are a popular means to stimulate sales of products such as grocery store items. In 1992, approximately 310 billion coupons were distributed and 7.7 billion coupons were redeemed, saving customers $4 billion. It has been estimated that in-store couponing coupled with advertising increases sales by 544%.

A typical marketing scheme involves placing coupons in a newspaper, by printing the coupons in the newspaper or by inserting coupon inserts into the newspaper, and allowing customers to bring the printed coupons to a store for redemption. One problem with this scheme is that the redemption rate is typically only a few percent of the coupons printed, the unredeemed coupons representing an overhead associated with this scheme. To alleviate this overhead, another marketing scheme involves distributing the coupons in the store, thereby avoiding the cost of printing coupons in a newspaper, and capitalizing on the fact that 66% of buyer decisions are made at the time of product purchase. Both the in-store scheme and the newspaper scheme, however, are susceptible to fraud by an unscrupulous retailer that requests reimbursement payments by presenting unredeemed coupons to the clearing house. Other schemes include delivering coupons to customers through the mail, distributing coupons in or on the product package, and distributing coupons at checkout. All of these schemes have an overhead cost of handling the coupons and of sending the redeemed coupons to a clearing house to enable product manufacturers to reimburse retailers for the reduction in proceeds resulting from coupon redemptions.

SUMMARY OF THE INVENTION

It is an object of the present invention to provide a convenient and stimulating shopping environment, having relatively low overhead.

It is another object of the present invention to provide a discounting system that does not generate paper waste.

To achieve these and other objects of the present invention, a system comprises a plurality of products; a dispenser including a plurality of portable cards each having a random access memory (RAM), means for receiving a first signal characterizing a customer, a mechanism for ejecting one of the cards from the dispenser, the ejected card storing a respective second signal, and means for storing an association between the first signal and the second signal; a checkout area including means for receiving a plurality of third signals from the RAM of the ejected card, each third signal corresponding to a product, means for receiving a fourth signal corresponding to a product, and means for determining a price depending on whether the fourth signal corresponds to one of the received third signals.

According to another aspect of the present invention, a system comprises a plurality of products; a dispenser including a plurality of portable cards each having a random access memory (RAM), means for receiving a first signal characterizing a customer, an electronic display, means for selecting a plurality of products by detecting a selection of locations on the display, means for sending a plurality of second signals to the RAM of a card in the plurality of cards, the second signals corresponding to the selected products, a mechanism for ejecting the card from the dispenser, the ejected card storing a respective third signal, and means for storing an association between the first signal and the third signal; and a checkout area including means for receiving the plurality of second signals from the RAM of the ejected card, means for receiving a fourth signal corresponding to a product, and means for determining a price depending on whether the fourth signal corresponds to one of the received second signals.

According to yet another aspect of the present invention, in a system including a plurality of products, a dispenser including a plurality of portable cards each having a random access memory (RAM), and a checkout area, a method of operating the system comprises the steps, performed in the dispenser, of receiving a first signal characterizing a customer; rejecting one of the cards from the dispenser, the ejected card storing a respective second signal; and storing an association between the first signal and the second signal, and the steps, performed in the checkout area, of: receiving a plurality of third signals from the RAM of the ejected card, each third signal corresponding to a product; receiving a fourth signal corresponding to a product; and determining a price depending on whether the fourth signal corresponds to one of the received third signals.

According to yet another aspect of the present invention, in a system including a plurality of products, a dispenser including a display, a plurality of portable cards each having a random access memory (RAM), and a checkout area, a method of operating the system comprising the steps, performed in the dispenser, of receiving a first signal characterizing a customer; selecting a plurality of products by detecting a selection of locations on the display; sending a plurality of second signals to the RAM of a card in the plurality of cards, the second signals corresponding to the selected products; ejecting the card from the dispenser, the ejected card storing a respective third signal; and storing an association between the first signal and the third signal, and the steps, performed in the checkout area, of receiving the plurality of second signals from the RAM of the ejected card; receiving a fourth signal corresponding to a product; and determining a price depending on whether the fourth signal corresponds to one of the received second signals.

BRIEF DESCRIPTION OF THE DRAWINGS

FIG. 11 shows some contents of a memory shown in FIG. 10.

The accompanying drawings which are incorporated in and which constitute a part of this specification, illustrate embodiments of the invention and, together with the description, explain the principles of the invention, and additional advantages thereof. Throughout the drawings, corresponding elements are labeled with corresponding reference numbers.

DESCRIPTION OF THE PREFERRED EMBODIMENT

Figure 1:
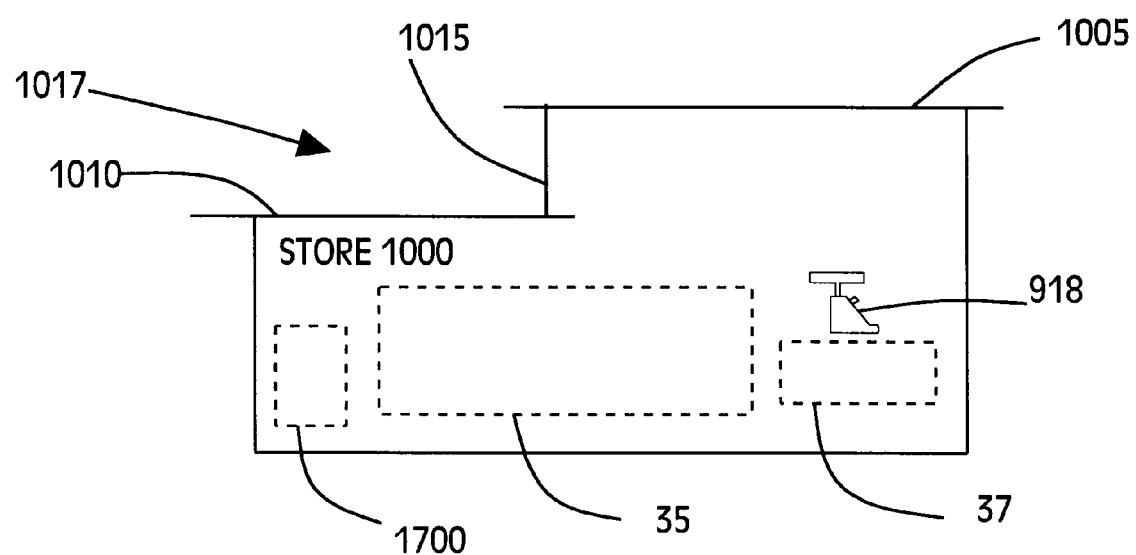
FIG. 1 is a schematic diagram of a retail system in accordance with a first preferred embodiment of the present invention.

FIG. 1 shows a store 1000 including roof structure 1017 and card-dispensing kiosk 1700 under roof structure 1017, in accordance with the preferred embodiment of the present invention. Roof structure 1017 includes roof section 1010, window 1015 coupled to roof section 1010, and roof section 1005 coupled to window 1015. Store 1000 also includes products 35 and checkout area 37 with cash register 918, under roof structure 1017.

Figure 2A:
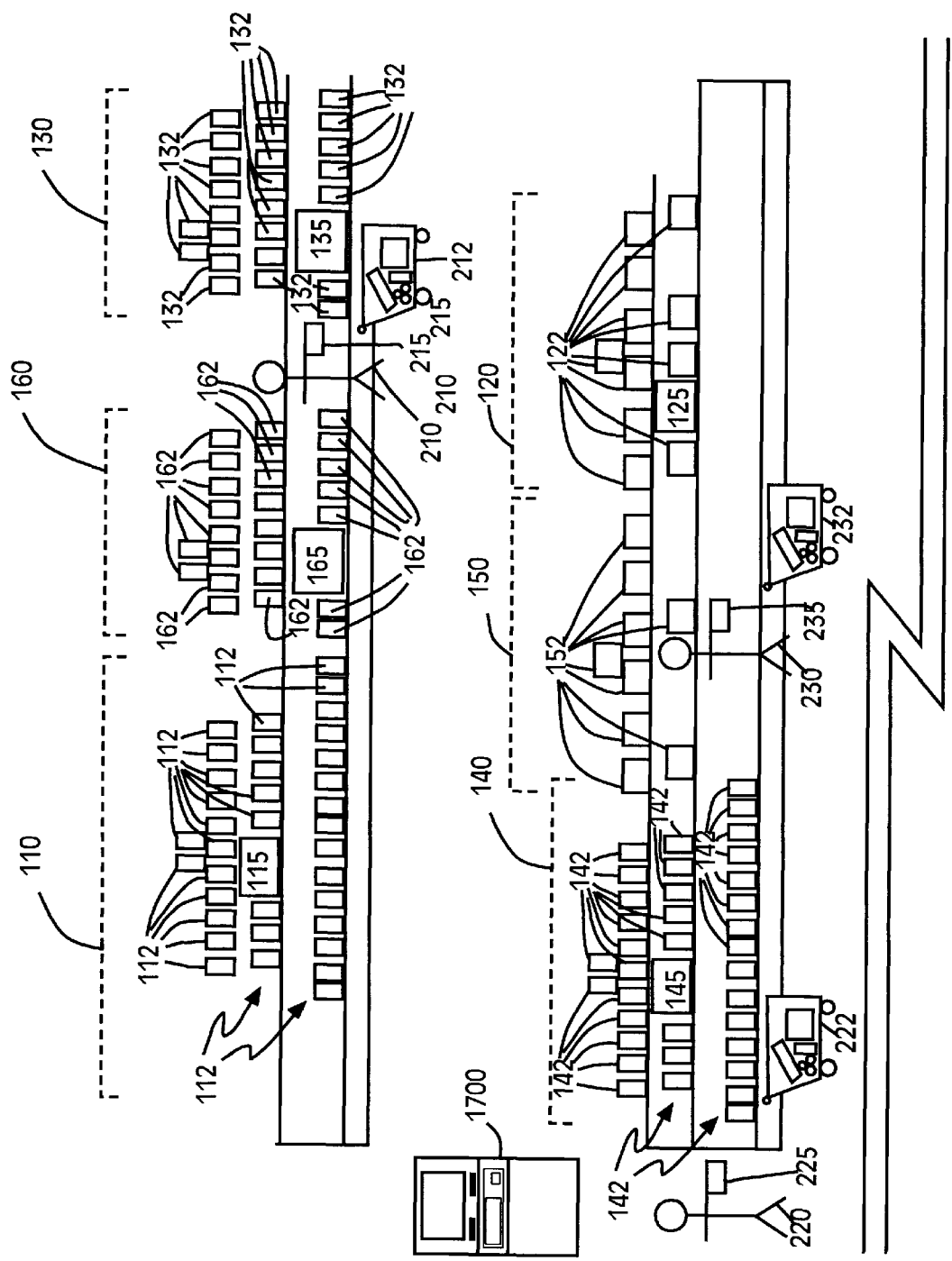
FIGS. 2A and 2B are another type of view of a part of the retail store.
Figure 2B:
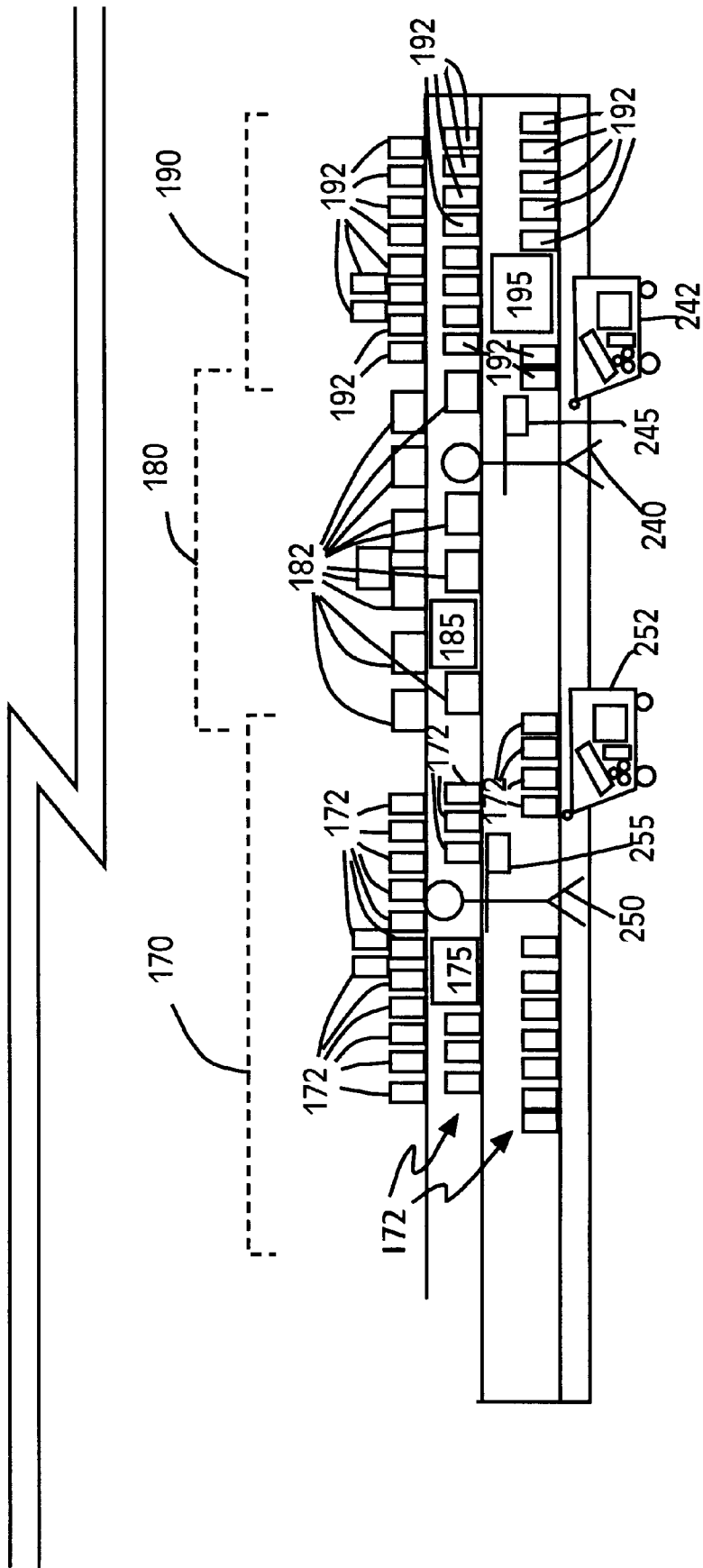

FIG. 2A and FIG. 2B are each a partial view of store 1000. Customers 210, 220, 230, 240, 250, 270, 280, and 290, shop in store 1000. Kiosk 1700 dispenses a respective portable customer card to each of these customers. Store 1000 has a plurality of product areas, each corresponding to a respective product. Product Area 110 has Acme brand ammonia. Product Area 120 has Old World brand pasta. Product Area 130 has Lighthouse brand light bulbs. Some of the product areas have a respective station for reading a customer card, described in more detail below. Product Area 110 has Station 115. Product Area 120 has Station 125. Product Area 130 has Station 135.

Figure 3A:
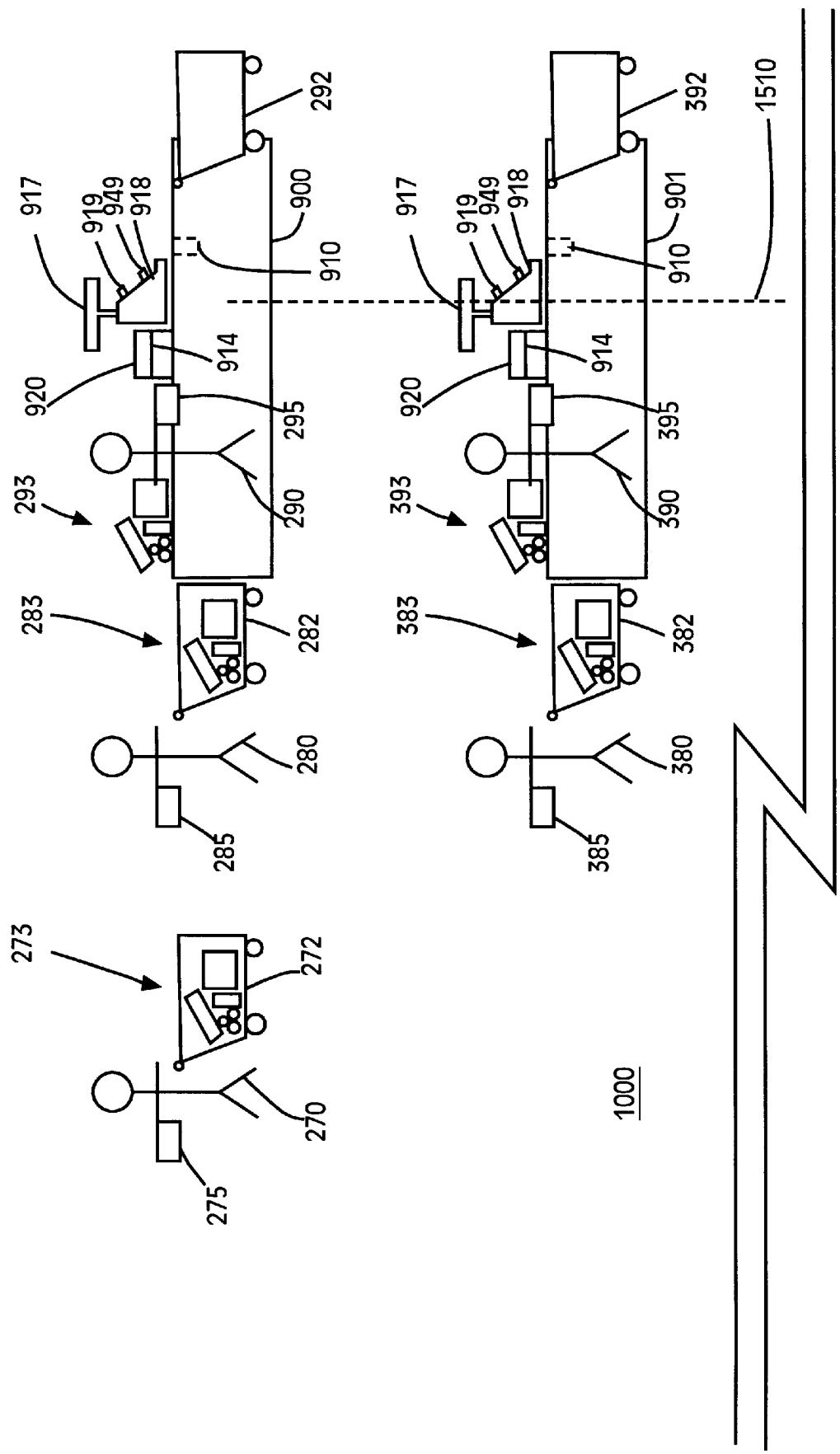
FIGS. 3A and 3B are the other type of view of another part of the retail store.
Figure 3B:
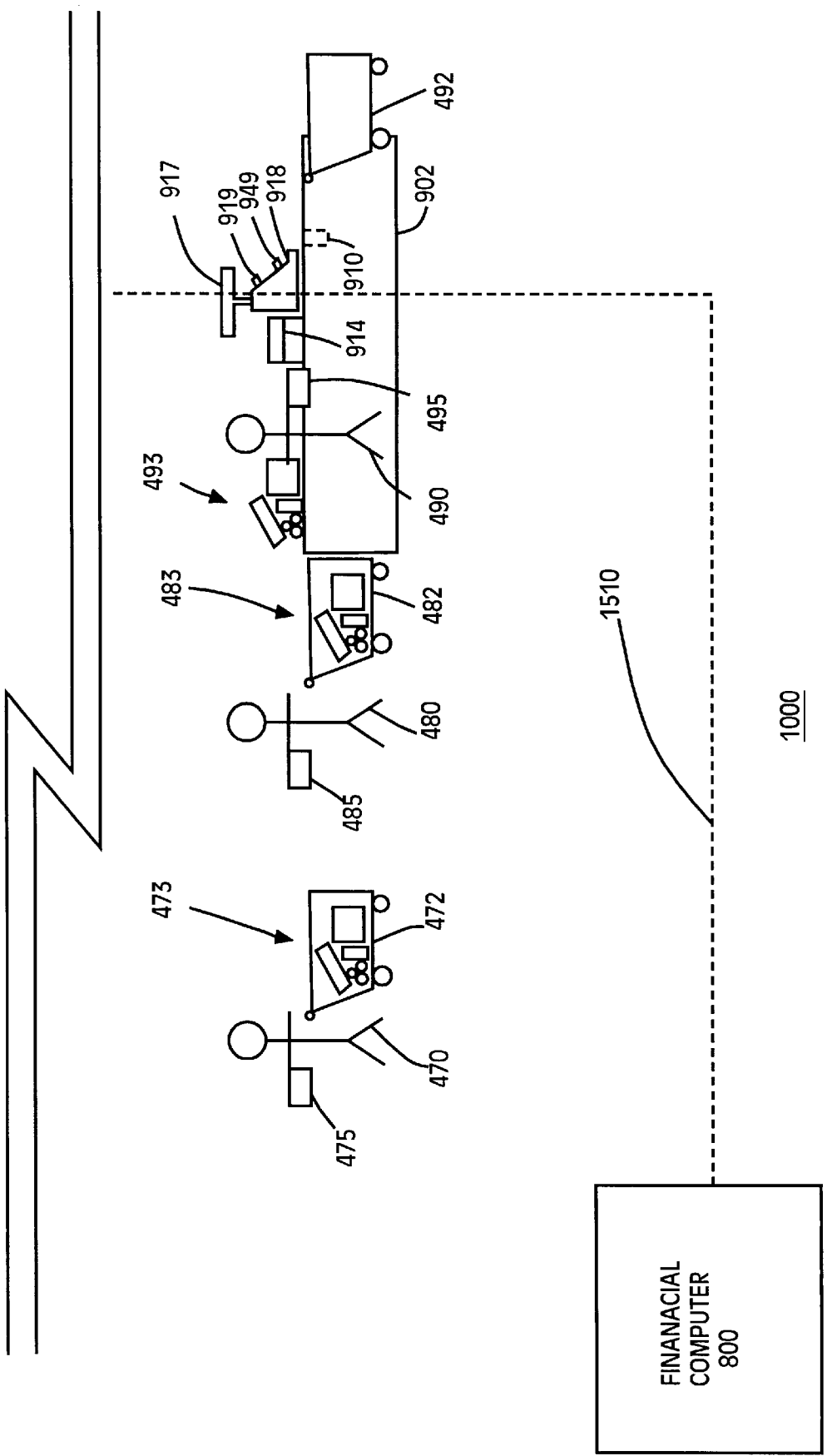

FIGS. 3A and 3B show another part of store 1000, including checkout stations 900, 901, and 902. Each checkout station includes a bar code reader that detects an optical (electromagnetic) signal reflected from a UPC product symbol. Each checkout station also includes a card interface slot 914.

While shopping in store 1000, each of customers 210, 220, 230, 240, 250, 270, 280, and 290 carries card dispensed by card-dispensing kiosk 1700. Customer 210 carries card 215, customer 220 carries card 225, customer 230 carries card 235, customer 240 carries card 245, customer 250 carries card 255, customer 270 carries card 275, customer 280 carries card 285, and customer 290 carries card 295. Each customer tows a shopping cart to hold selected products. Customer 210 tows cart 212, customer 220 tows cart 222, customer 230 tow cart 232, customer 240 tows cart 242, customer 250 tows cart 252, customer 270 tows cart 272, customer 280 tows cart 282, and customer 290 tows care 292. To create an electronic coupon, the customer inserts the card into an interface slot of the product station adjacent to a product the customer wishes to purchase, and the product station then writes an electronic coupon onto the card. In other words, the product station writes an electronic coupon into a memory on the card, in response to a person presenting the card at the product station. The customer then removes the product from the shelf and places the removed product into her cart. The customer thus shops throughout the store collecting electronic coupons for products of interest.

Thus, each product station is a device, spatially removed from kiosk 1700, for writing a coupon signal into the RAM of a customer card.

Upon completion of shopping, the customer brings selected products from the shelves to checkout counter 900, 901, or 902. The customer redeems the electronic coupons by inserting her customer card into card interface 915. For example, a customer such as customer 290 in FIG. 3A completes the purchase of her selected products 293 by transferring products 293 from her cart 292 to counter 900, and by inserting card 295 into card interface slot 914. Subsequently, a checkout clerk (not shown) scans each selected product past bar code reader 910.

Similarly, customer 390 in FIG. 3A will complete the purchase of her selected products 393 by transferring products 393 from her cart 392 to station 901, and by inserting card 395 into interface slot 914 of station 901; and the checkout clerk (not shown) will scan each selected product 393 past UPC bar code reader 910. Customer 490 in FIG. 3B will complete the purchase of his selected products 493 by transferring products 493 from his cart 422 to station 902, and by inserting card 495 into interface slot 914 of station 902; and the checkout clerk (not shown) will scan each selected product 493 past UPC bar code reader 910 of station 902.

The products and UPC product symbols in store 1000 will now be described in further detail.

Figure 4A:
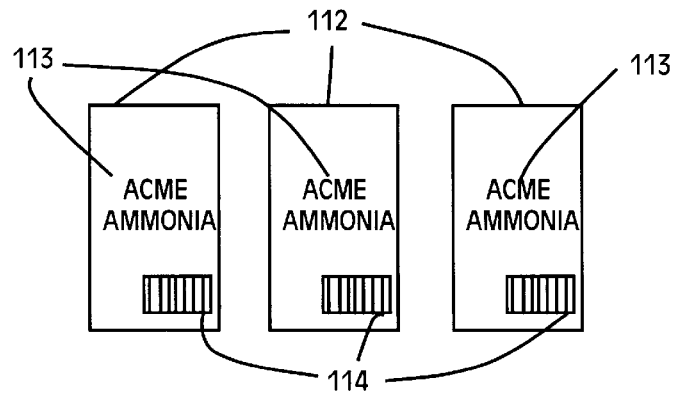
FIGS. 4A, 4B, and 4C are enlarged views of some products shown in FIGS. 3A and 3B.

Product area 110 has bottles of ammonia 112 contiguously grouped together on multiple shelves. Bottles of ammonia 112 are contiguously grouped, meaning that no other product is between any two bottles of ammonia 112. FIG. 4A shows an enlarged view of some of the bottles of ammonia 112. Each bottle of ammonia has a common Universal Product Code (UPC) symbol 114. Symbol 114 encodes a 12-digit number that is part of a product identification system documented by the Uniform Code Council, Inc., Dayton, Ohio. In UPC Product Code format, the first digit is a 0, designating a product. The next five digits are a manufacturer ID. The next 5 digits are an item number. The last digit is a check digit.

Each UPC symbol 114 is a group of parallel lines that encodes a number (0 17075 00003 3) that uniquely identifies acme ammonia. In other words, symbol 114 is different from UPC symbols of units of other products. Each bottle of ammonia 112 also has a common character label 113 that verbally describes the product. Character label 113 is "ACME AMMONIA." Label 113 is different from labels of units of other products.

Figure 4B:
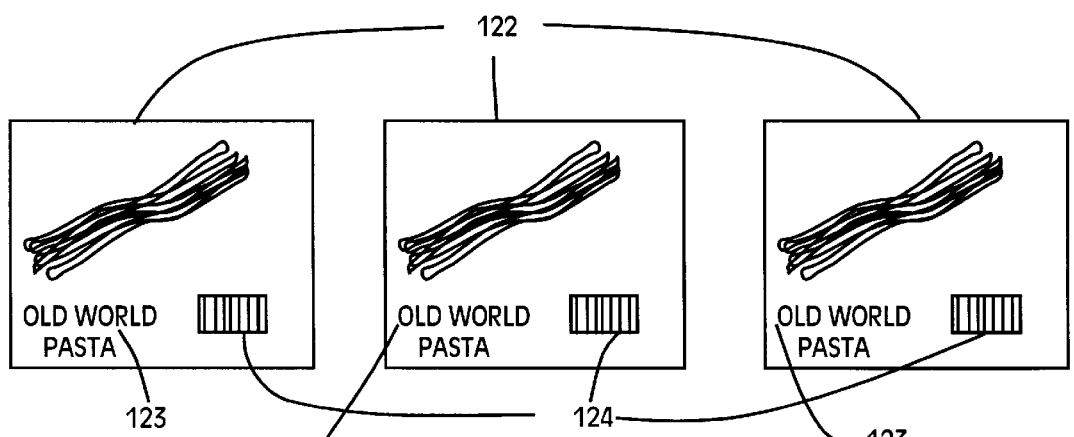

Product Area 120 has boxes of pasta 122 contiguously grouped together on multiple shelves. FIG. 4B shows an enlarged view of some of the boxes of pasta 122. Each box of pasta 122 has a common UPC symbol 124, which is a group of parallel lines that encodes a number (0 17031 00005 3) that uniquely identifies Old World pasta. In other words, symbol 124 is different from UPC symbols of units of other products. Each box of pasta 122 also has a common character label 123 that verbally describes the product. Character label 123 is "OLD WORLD PASTA." Label 123 is different from labels of units of other products.

Figure 4C:
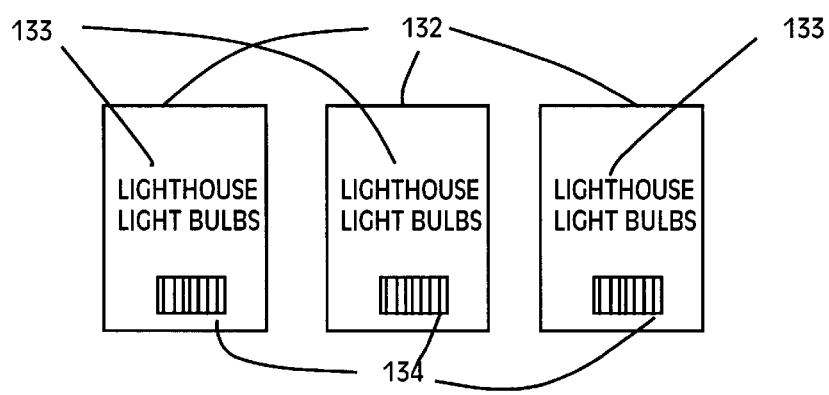

Product Area 130 has boxes of light bulbs 132 grouped together on multiple shelves. FIG. 4C shows an enlarged view of some of the boxes of light bulbs 132. Each box of light bulbs 132 has a common UPC symbol 134, which is a group of parallel lines that encode a number (0 17054 01017 6) that uniquely identifies Lighthouse light bulbs. In other words, symbol 134 is different from UPC symbols of other products. Each box 132 also has a common character label 133 that verbally describes the product. Character label 133 is "LIGHTHOUSE LIGHT BULBS." Label 133 is different from labels of other products.

Similarly, other product areas in store 1000 each have a set of respective products contiguously grouped together. Respective units of a certain product have a common UPC symbol, different from UPC symbols on units of other products, that uniquely identifies the certain product. Respective units of a certain product have a common label, different from labels on units of other products, that uniquely identifies the certain product. Product area 140 has bottles of ketchup 142 contiguously grouped together, and product station 145 adjacent to the bottles of ketchup 142. Product area 160 has loaves of bread 162 contiguously grouped together, and product station 165 adjacent to loaves of bread 162. Product area 170 has cartons of milk 172 contiguously grouped together, and product station 175 adjacent to cartons of milk 172. Product area 180 has packages of bacon 182, and product station 185 adjacent to packages of bacon 182. Product area of 190 has packages of butter 192 contiguously grouped together and product station 195 adjacent to packages of butter 192.

Product area 150 has boxes of cereal 152 contiguously grouped together. Product area 150 does not have a product station.

Figures 5A, 5B:
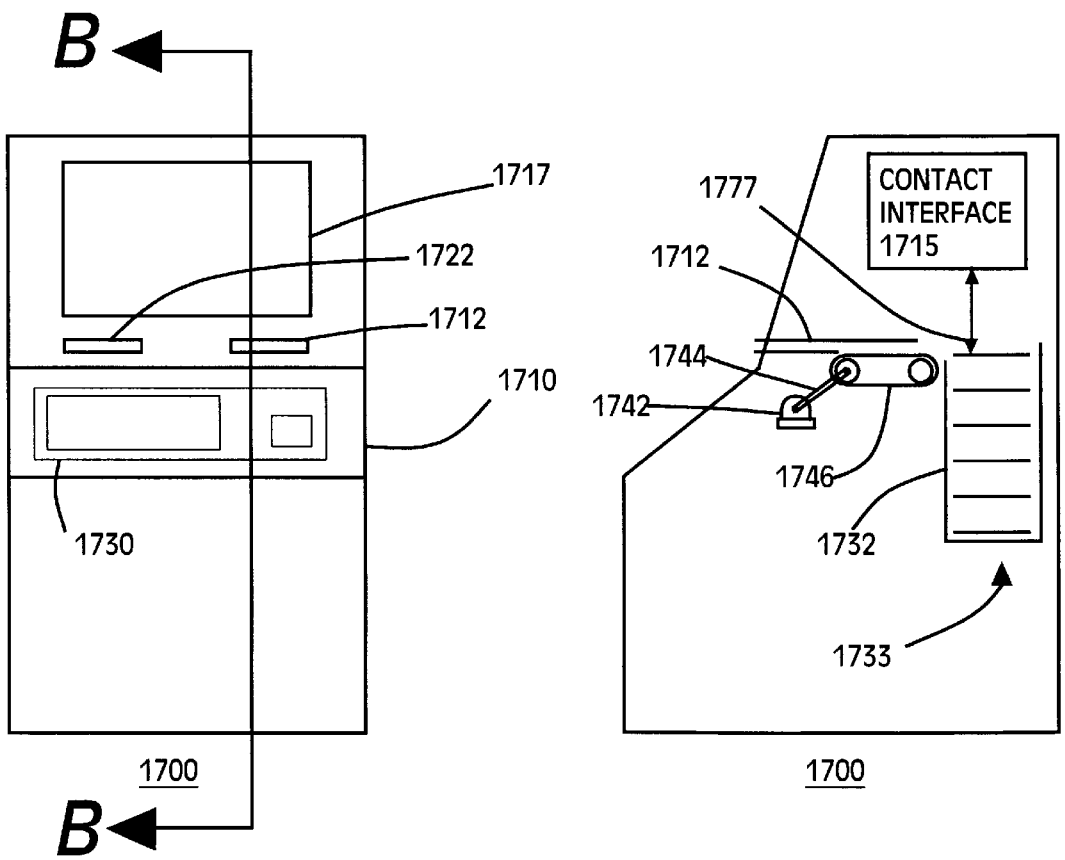
FIGS. 5A and 5B are views of the kiosk for dispensing cards in the preferred system.

FIGS. 5A shows a front view of the exterior of card-dispensing kiosk 1700, and FIG. 5B shows a side cut-away view taken along the line B—B shown in FIG. 5A. Kiosk 1700 includes a cathode ray tube (CRT) display 1717 for displaying coupon selection options to a customer, and an alphanumeric keyboard 1730. Keyboard 1730 has a respective key (hand-actuated switch) for each of the letters A–Z and each of the numerals 0–9. Kiosk 1700 collects information about a customer via keyboard 1730 or via card reader 1722. After collecting customer demographic information and the customer's coupon selection options, kiosk 1700 writes the selected electronic coupons onto a customer card and ejects the customer card through card dispensing slot 1712.

As shown in FIG. 5B, card interface 1715 has a conductive contact 1777 for touching card contact 8427 (shown in FIG. 6C) on the customer card that is at the top of customer card storage stack 1732. Interface 1715 has other contacts (not shown) for touching the other card contacts 8420 (shown in FIG. 6C). The operation of station 1700 will be discussed in more detail below.

After interface 1715 writes electronic coupons to the top card in stack 1732, electric motor 1742 moves conveyor belt 1746, via chain 1744, to move the top card from stack 1732 to dispensing slot 1712.

Figures 6A, 6B:
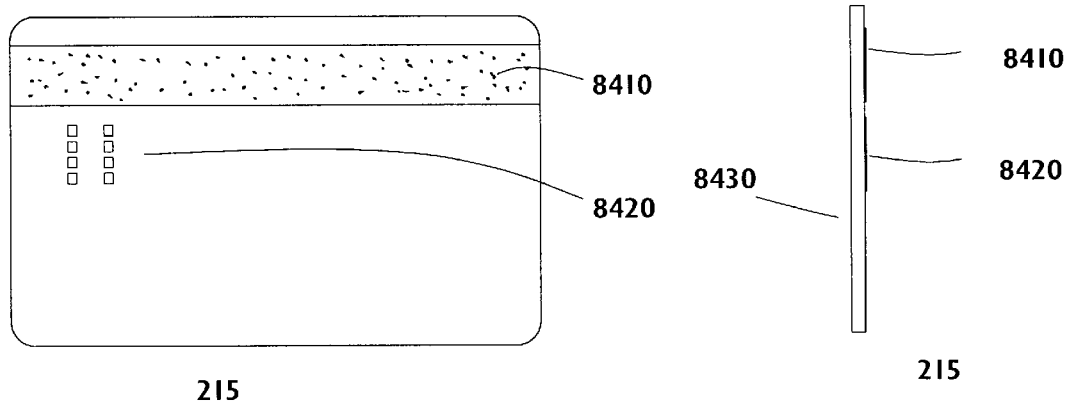
FIG. 6A is a plan view of one of the customer cards shown in FIGS. 2A, 2B, 3A and 3B.
FIG. 6B is a side view of the card shown in FIG. 6A.

FIG. 6A shows a plan view of customer card 215 carried by customers 210, and FIG. 6B shows a side view of card 215. Card 215 is 8.5 cm by 5.4 cm, the length and width of a typical financial credit card. Card 215 is slightly thicker than a typical financial credit card. Card 215 includes a magnetic stripe 8410, interface contacts 8420 for communication with the checkout station, and embossed area 8430 for displaying the card owner's name. Magnetic stripe 8410 allows a conventional credit card stripe reader to read basic data from the card. Magnetic stripe 8410 is not necessary to the operation of the preferred embodiment of the invention, described in more detail below.

Figure 6C:
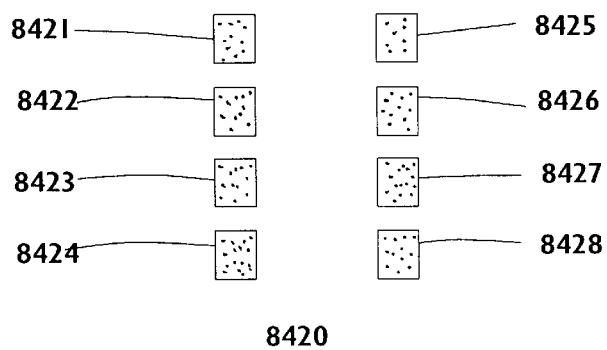
FIG. 6C is an enlarged, partial view of the card shown in FIG. 6A.

FIG. 6C shows interface contacts 8420 in more detail. Interface contacts 8420 are configured in accordance with ISO 7816-2: 1988(E), Identification cards—Integrated circuit (s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 8421 is assigned to VCC (supply voltage), contact 8422 is assigned to RST (reset signal), contact 8423 is assigned to CLK (clock signal), contact 8424 is reserved for future use, contact 8425 is assigned to GND (ground), contact 8426 is assigned to VPP (program and voltage), contact 8427 is assigned to I/O (data input/output), and contact 8428 is reserved for future use. Card 215 communicates with the checkout stations through contact 8427 using a half duplex scheme, meaning that contact 8427 is for communicating data signals either to or from the card.

Figures 7, 8:
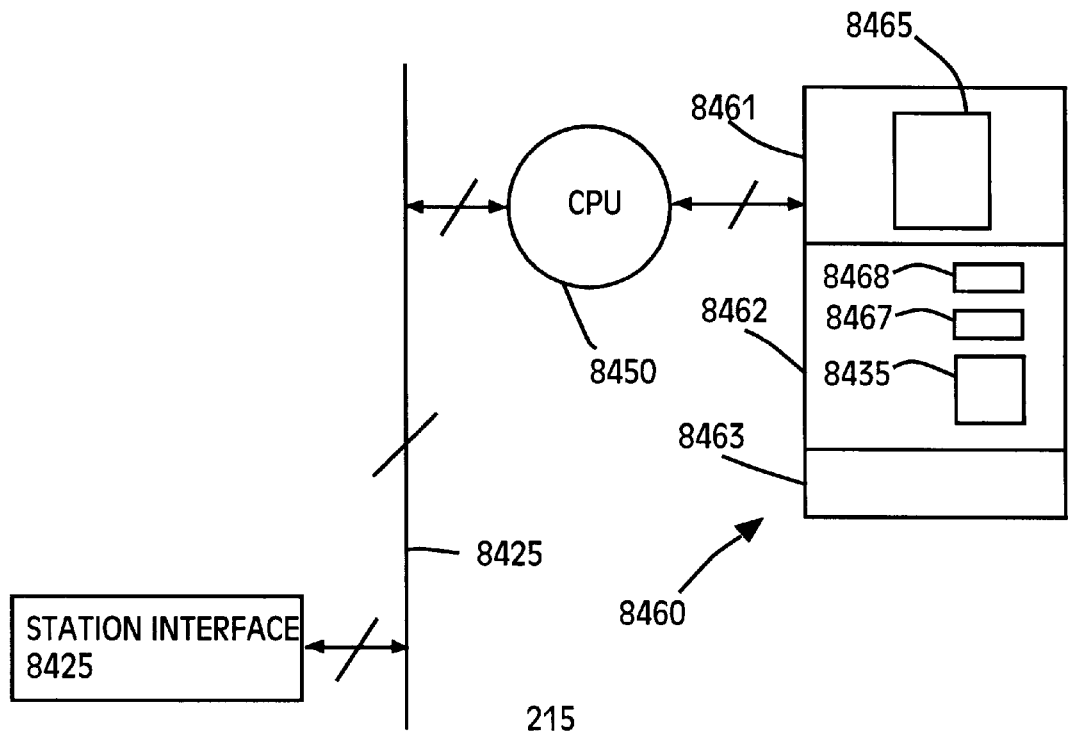
FIG. 7 is a block diagram of a customer card.
FIG. 8 is a diagram of some memory contents of a customer card.

FIG. 7 is a block diagram of customer card 215, including central processing unit 8450, processor 8450, and memory 8460. Random access memory 8460, includes three addressable segments: nonvolatile read only memory (ROM) 8461; nonvolatile, electrically erasable memory (EEPROM) 8462; and memory 8463 for temporary storage. Station interface 8425 includes a serial to parallel converter for transferring data signals between contact 8427 and CPU 8450 over parallel bus 8452. ROM 8461 stores a program 8465 executed by processor 8450. EEPROM 8462 stores customer identification data 8467, and authorization data 8468. Customer identification data 8467 includes a sequence of digits that uniquely identifies the holder of the card. Customer identification data 8467 includes the card holder's social security number. For example, identification data 8467 in customer card 235 uniquely identifies customer 230. Authorization data 8468 may include a sequence of digits that includes a code identifying the store or stores in which the card may be used to obtain a paperless coupon. Authorization data 8468 may also include date data indicating an expiration date for the card. Depending on the card holder's contractual relationship with the card issuer, the card issuer may periodically update this date data to renew the card when the current date data indicates the card is expired. Store authorization data 8468 also contains a field identifying that the card is a customer card.

EEPROM 8462 also stores product data received from one or more coupon dispensing devices. This product data includes a list of product discounts 8435. When a customer inserts a customer card into a coupon dispensing device, processor 8450 receives a coupon code for the product from the device and adds the code to the list.

FIG. 8 some the contents list 8435 starting at offset 30 of EEPROM 8462 of customer card 215. An electronic coupon is a 12 digit number in UPC Coupon Code format. In this format, the first digit is a 5, designating a coupon. The next five digits are a manufacturer ID. The next 3 digits are a family code. The next 2 digits are a value code. The last digit is a check digit. In FIG. 8, the customer card is storing three electronic coupons, reflecting the fact that customer 210 has received electronic coupons from coupon dispensing devices. In list 8435, the memory field having the number 5 17031 268 45 8 corresponds to a coupon for purchase of a box of Old World Pasta 124. The memory field having the number 5 17054 235 76 5 corresponds to a coupon for purchase of a box of Lighthouse Light Bulbs 134. The memory field having the number 5 17075 278 30 7 corresponds to a coupon for purchase of bottle of ammonia bottles 112.

Each of the customer cards has the same hardware structure as customer card 215.

Figure 9:
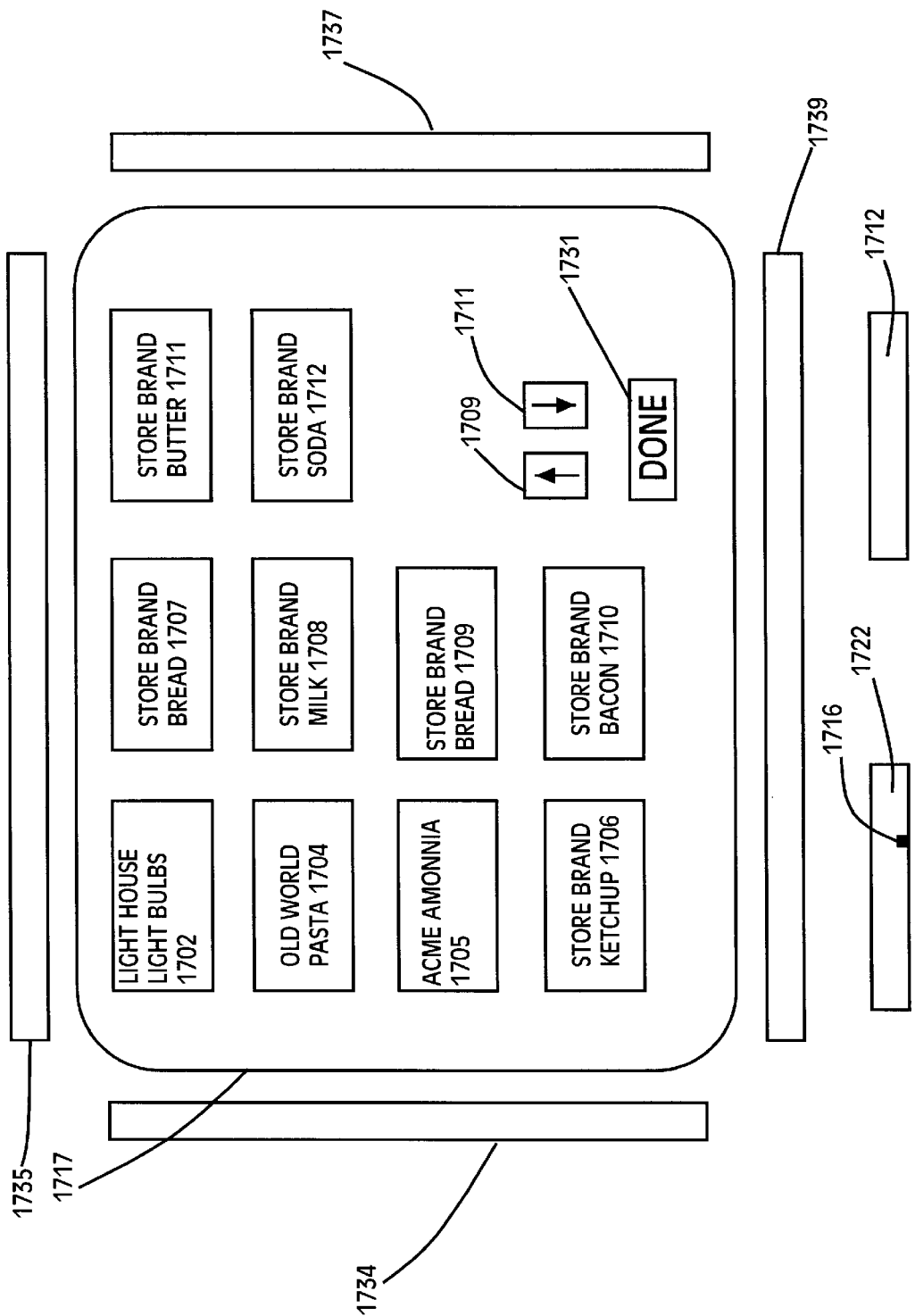
FIG. 9 is a diagram of the exterior of the kiosk shown in FIG. 2A.

FIG. 9 shows a part of card-dispensing kiosk 1700 in more detail. Kiosk 1700 displays icons 1702, 1704, 1705, 1706, 1707, 1708, 1709, 1710, 1711, and 1712 representing products for which coupons are being offered. Some of the icons, such as icon 1704 representing old world pasta, are an image of the represented product. A customer selects a coupon by touching the icon with her finger, causing a light beam from light source 1734 to be interrupted and the interruption detected by Y coordinate detector array 1737, and causing a light beam from light source 1735 to be interrupted and the interruption detected by X coordinate detector array 1739. Thus, kiosk 1700 detects coupon selections by the customer.

Scroll buttons 1709 and 1711 allow the user to cause icons for other products to be displayed. DONE button 1731 allows the user to complete the coupon dispensing session.

In addition to collecting customer information via keyboard 1730, kiosk 1700 may also collect customer identification and customer demographic data from a card already held by a customer, via interface slot 1722. Interface slot 1722 has a width sufficient to accommodate the width of one of the customer cards. When a customer card is in interface slot 1722, conductive contact 1716 inside interface slot 1722 touches contact 8427 (shown in FIG. 6C) on a customer card. Interface slot 1722 has other contacts (not shown) for touching the other card contacts 8420 (shown in FIG. 6C).

The preferred system and method will now be described in more detail.

Figure 10:
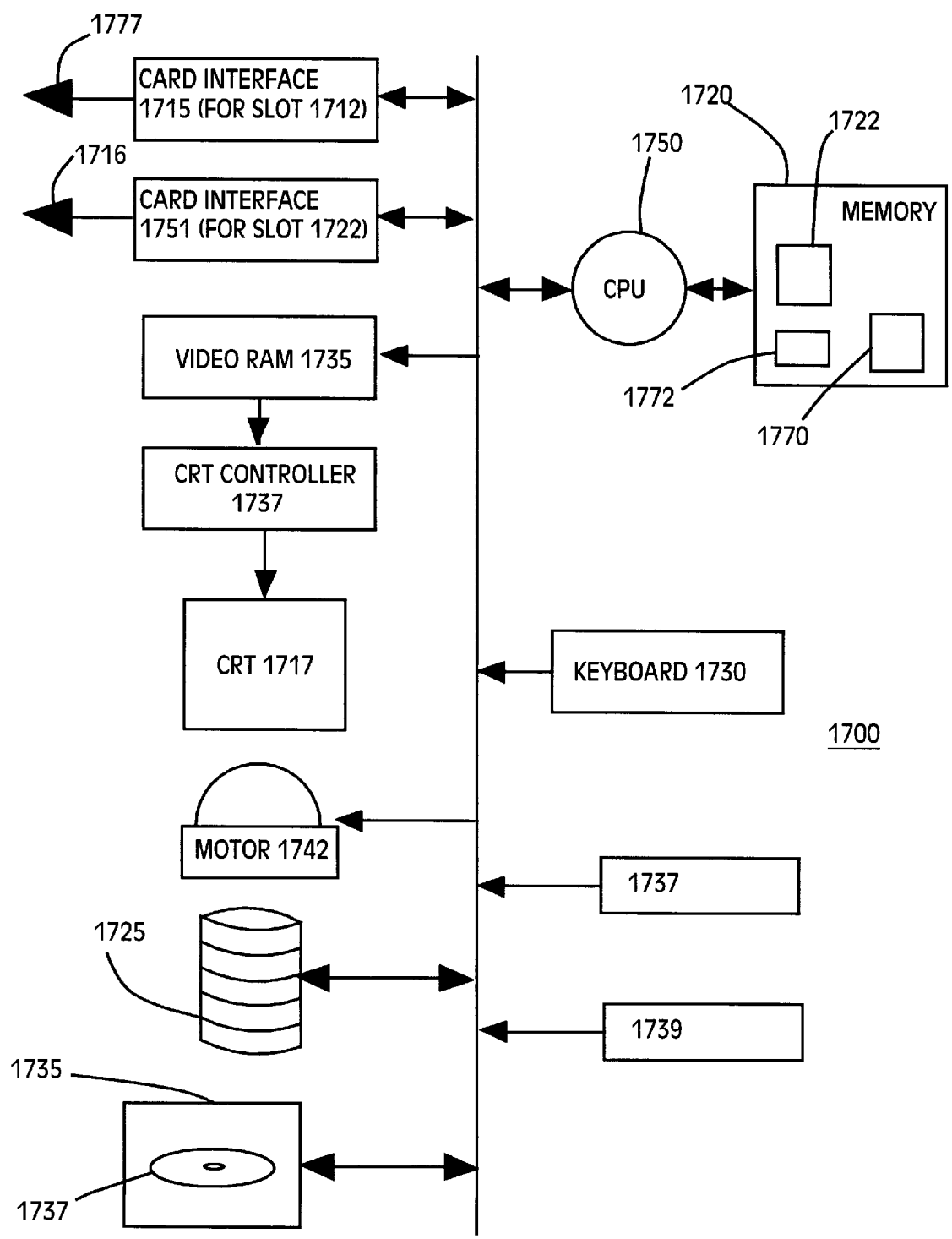
FIG. 10 is a block diagram of the kiosk shown in FIG. 2A.

FIG. 10 is a block diagram of display kiosk 1700 shown in FIGS. 1, 2A, 5A, and 5B. Magnetic disk drive 1725 provides storage of programs and of product coupon data. Optical disk drive 1735 contains a CD-ROM (Compact Disk-Read Only Memory) disk that stores product image data. The contents of CD-ROM 1737 tend to remain current for at least several months, since the packaging of a product corresponding to a certain UPC code tends to remain constant over time. Preferably, CD-ROM 1737 can be obtained from a national supplier.

CRT display 1717 is 1024 pixel rows by 1280 pixel columns. Video ram 1735 has 1024×1280 locations, a location for each pixel on display 1717. CRT controller 1737 has circuitry to read video ram 1735 to generate and send signals to CRT 1717. Thus, the address of a pixel in video ram 1735 determines the location of the pixel on display 1717.

CPU 1750 executes program 1722, in random access, addressable memory 1720, to display coupon-related information. CPU 1750 displays the information on CRT display 1717, by writing pixel data into video RAM 1735. CRT controller 1737 reads the pixel data from RAM 1737 to send video signals to CRT 1717.

Keyboard 1730 has a respective key (hand-actuated switch) for each of the letters A–Z and each of the numerals 0–9, for generating a customer characterization signal.

Card interface 1751 has a conductive contact 1716 for receiving a customer characterization signal from contact 8427 (shown in FIG. 6C) on a customer card in slot 1722. Interface 1751 has other contacts (not shown) for touching the other card contacts 8420 on the customer card in slot 1722 (shown in FIG. 6C).

Card interface 1715 has a conductive contact 1777 for sending the customer characterization signal, from keyboard 1730 or interface 1751, to contact 8427 (shown in FIG. 6C) on the customer card that is at the top of customer card storage stack 1732. Interface 1715 has other contacts (not shown) for touching the other card contacts 8420 (shown in FIG. 6C).

Thus, kiosk 1700 includes a card-storage stack 1732 for storing a plurality of portable cards 1733 each having a memory. Interface 1715 includes circuitry for writing a coupon signal into the memory of a card in the plurality of cards, the coupon signal corresponding to a product in store 1000. Subsequently, a motor 1742 acts to eject the card from kiosk 1700. A checkout station has circuitry for reading coupon signals from the memory of the card, in response to a person presenting the card at interface slot 914 during checkout. UPC reader 910 acts to detect a UPC product signal identifying a product. Checkout station 900 acts to determine a price depending on whether the UPC product signal corresponds to one of the coupon signals read from the card.

FIG. 11 shows a table 1772 compiled by kiosk 1700. Each row in table 2 represents a customer. The left column in table 2 is respective customer identification data 8467 from customer cards dispensed by kiosk 1700. The other columns in table 1772 are data characterizing a customer. Processor 1750 writes the other columns in response to a signal received from keyboard 1730. For example, the customer holding the card with ID 3 was born on Mar. 12, 1932, has an income of 30,100, a household size of 2, and no children in the household. Thus, if the data characterizing each customer is considered a first signal, and the corresponding card ID is considered a second signal, table 1772, in memory 1720, is essentially a signal that stores an association between the first signal and the second signal.

Figure 12:
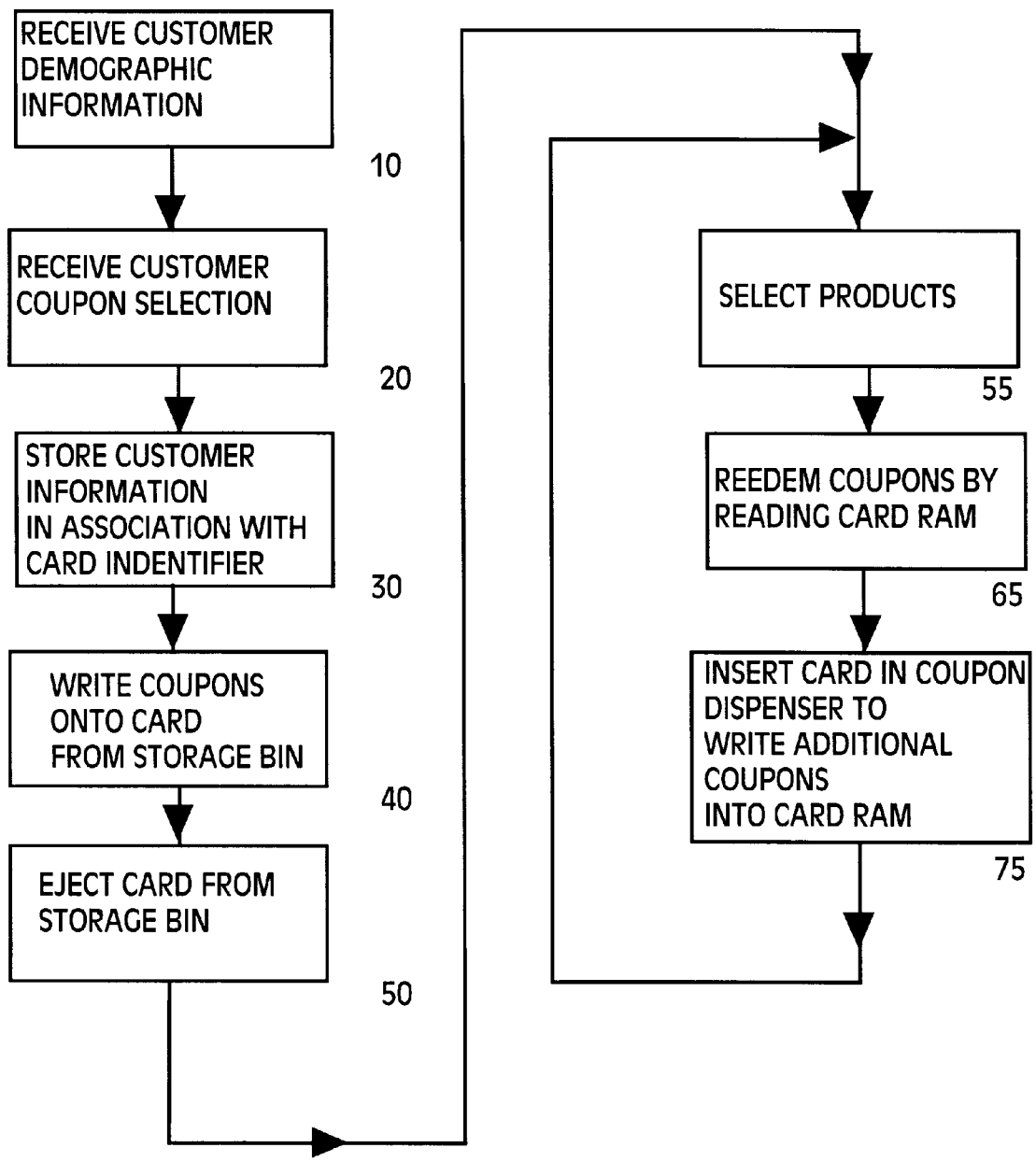
FIG. 12 is a flow chart showing a processing performed by the kiosk.

FIG. 12 shows a processing performed in the preferred system. CPU 1750, executing program 1772, receives customer identification and demographic information, via keyboard 1730 or interface slot 1722. CPU 1750 queries the customer with questions to collect demographic signals, including birth date of card-holder, income level, past buying patterns, geographic location, size of household, number of children in household, level of education, and job-related data. CPU 1750 receives these demographic signals from keyboard 1730 and writes these signals into table 1772 in memory 1720. (Step 10).

CPU 1750 receives customer coupon selection information, by receiving signals from Y coordinate detector array 1737 and X coordinate detector array 1739. (Step 20).

CPU 1750 allows the user to create customer ID data 8467 by entering a social security number via keyboard 1730. CPU 1750 writes the customer ID data 8467 of the top card in card storage stack 1732. In other words, CPU 1750 sends a respective identification signal to the top card in storage stack 1732.

CPU 1750 creates a record in table 1772, by storing the customer ID data 8467 in association with the customer characterization information in table 1772. (Step 30). Card interface 1715 writes the selected coupons onto the top card in card stack 1732. (Step 40). In other words, CPU 1750 and detector arrays 1737 and 1739 act to select a plurality of products by detecting a selection of locations on CRT display 1717, and CPU 1750 and contact interface 1715 act to send a plurality of coupon signals to RAM 8460 of the top card in stack 1732.

CPU 1750 sends a signal to electric motor 1742 to cause motor 1742 to move conveyor 1746, thereby propelling the top card from stack 1732 to dispensing slot 1712. (Step 50).

The customer may then shop through the store by selecting certain products (Step 55) and redeeming electronic coupons at a checkout station. (Step 65). The user may also load additional coupons onto her card by inserting the card in a coupon dispensing unit, such as product station 165. (Step 75). The customer may then repeat steps 55, 65, and 75.

Figure 13:
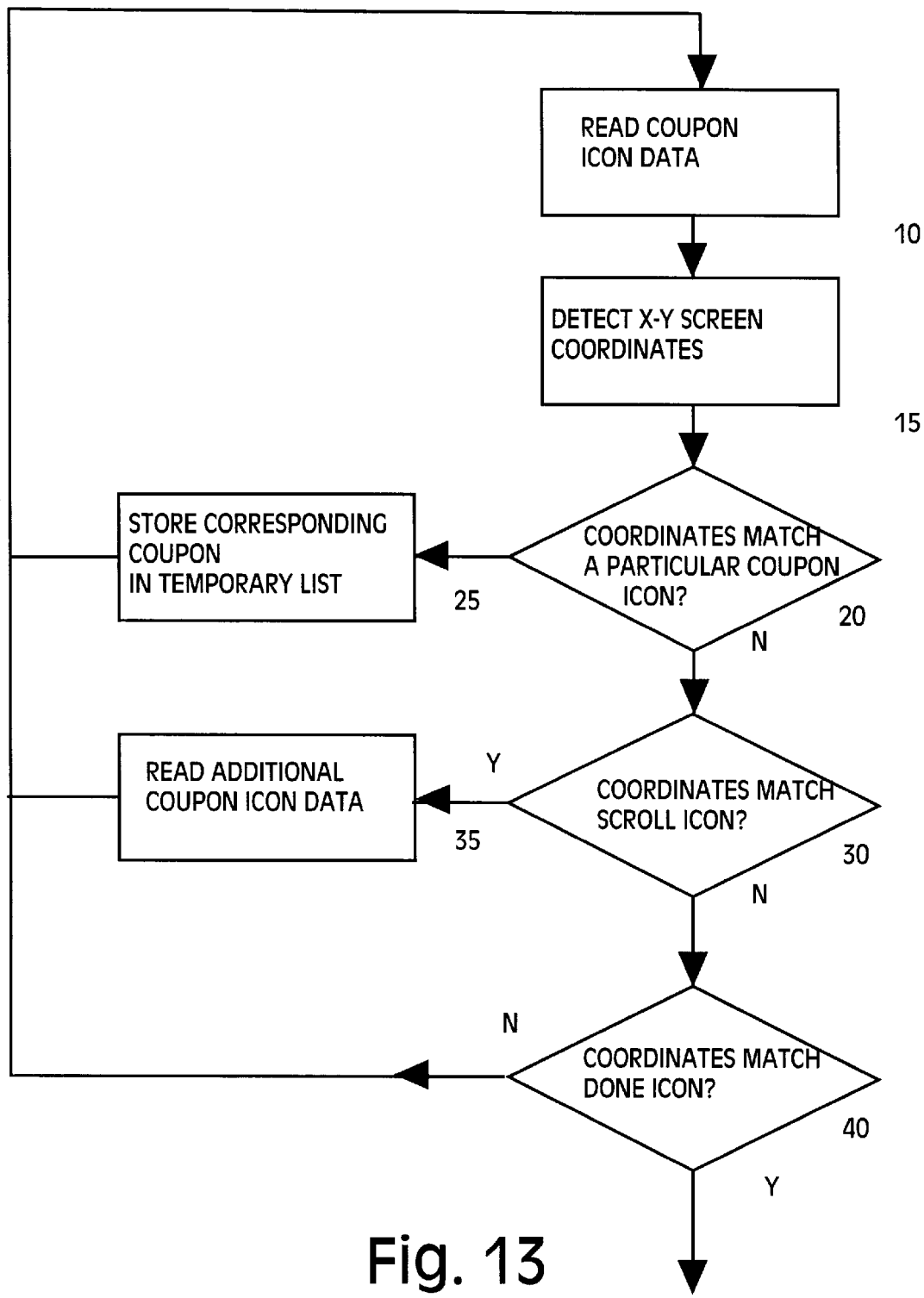
FIG. 13 is another flow chart showing a step of the processing shown in FIG. 12 in more detail.

FIG. 13 shows the processing of step 20 of FIG. 12, receiving customer coupon selections, in more detail. CPU 1750, executing program 1722, reads signals data from disk 1725 and CD-ROM drive 1735, to display coupon icons on CRT 1717. (Step 10). CPU 1750 detects whether the user has touched a portion of CRT 1717, by reading signals from detector arrays 1737 and 1739. (Step 15). If the touched coordinates match the spacial location of one of the icons displayed on CRT 1717 (Step 20), CPU 1750 stores the corresponding coupon in temporary coupon list 1770. (Step 25). If the coordinates instead match one of the scroll icons 1709 or 1711 (Step 30), CPU 1750 reads additional signals from disk 1725 and CD-ROM drive 1735, to display additional icons on CRT 1717. (Step 35). If the user touches the DONE icon (step 40), the processing of FIG. 13 terminates.

Each of customers 210, 220, 240, 250, 270, 280, and 290 obtained a respective customer card in a similar manner. Kiosk 1700 subsequently sends table 1772, shown in FIG. 11, to a marketing research center that stores the contents of table 1772 on disk.

Figure 14:
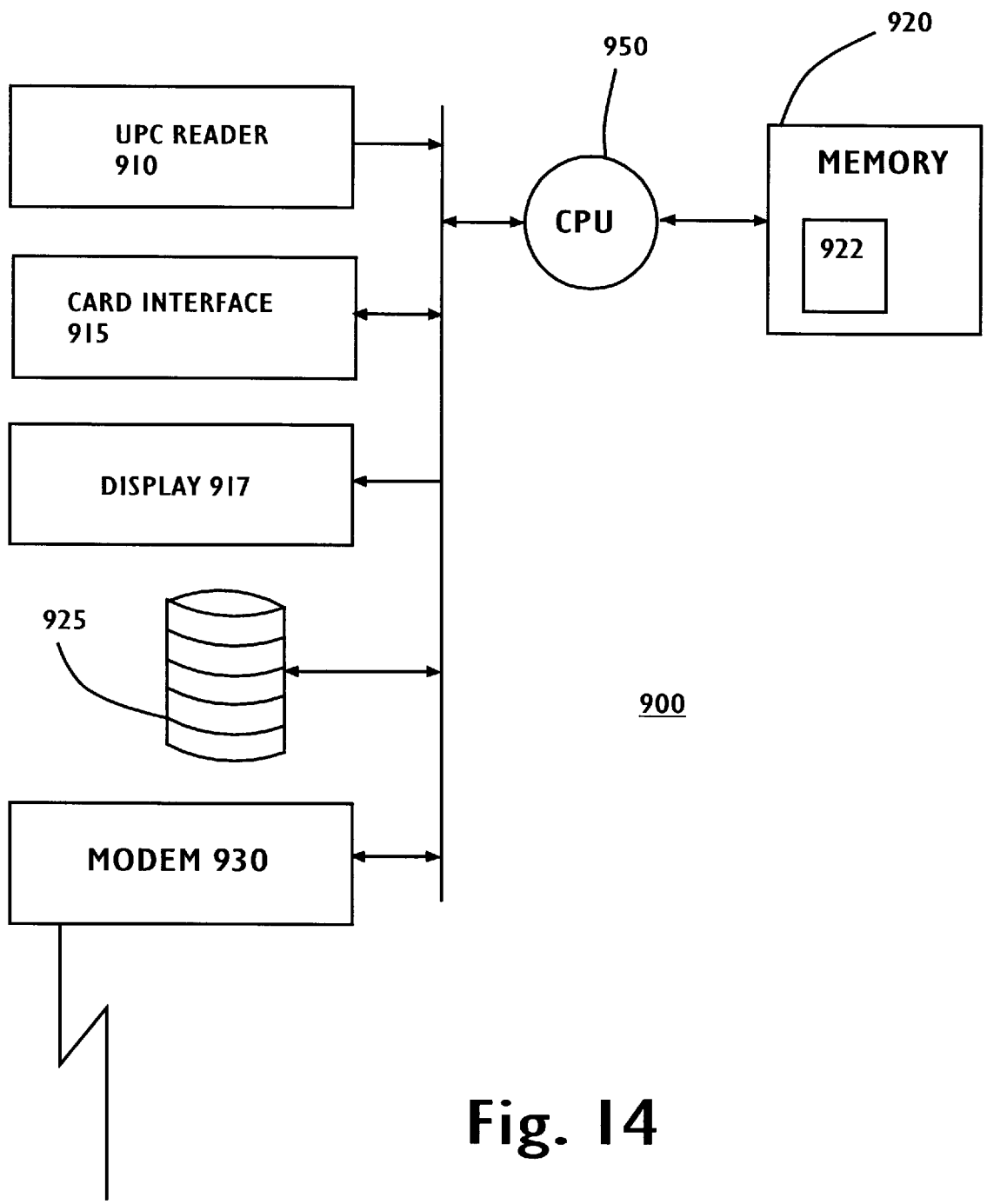
FIG. 14 is a block diagram of each checkout station in the preferred system.

FIG. 14 is a block diagram of checkout counter 900. Disk 925 provides long term storage. CPU 950 executes instructions in random access, addressable memory 920.

CPU 950 and program 922 act to detect a product scanned by UPC reader 910, determine a reference price for the product, and deduct a discount from the reference price if the product has a corresponding coupon in the customer card memory. CPU 950 then displays the price of the product on display 917. CPU 950 writes coupon redemption data onto disk 925. Periodically, CPU 950 sends marketing redemption data, including customer ID data 8467, to a market research center through modem 930. Periodically, CPU 950 also sends clearing house redemption data to a clearing house through modem 930.

Figure 15:
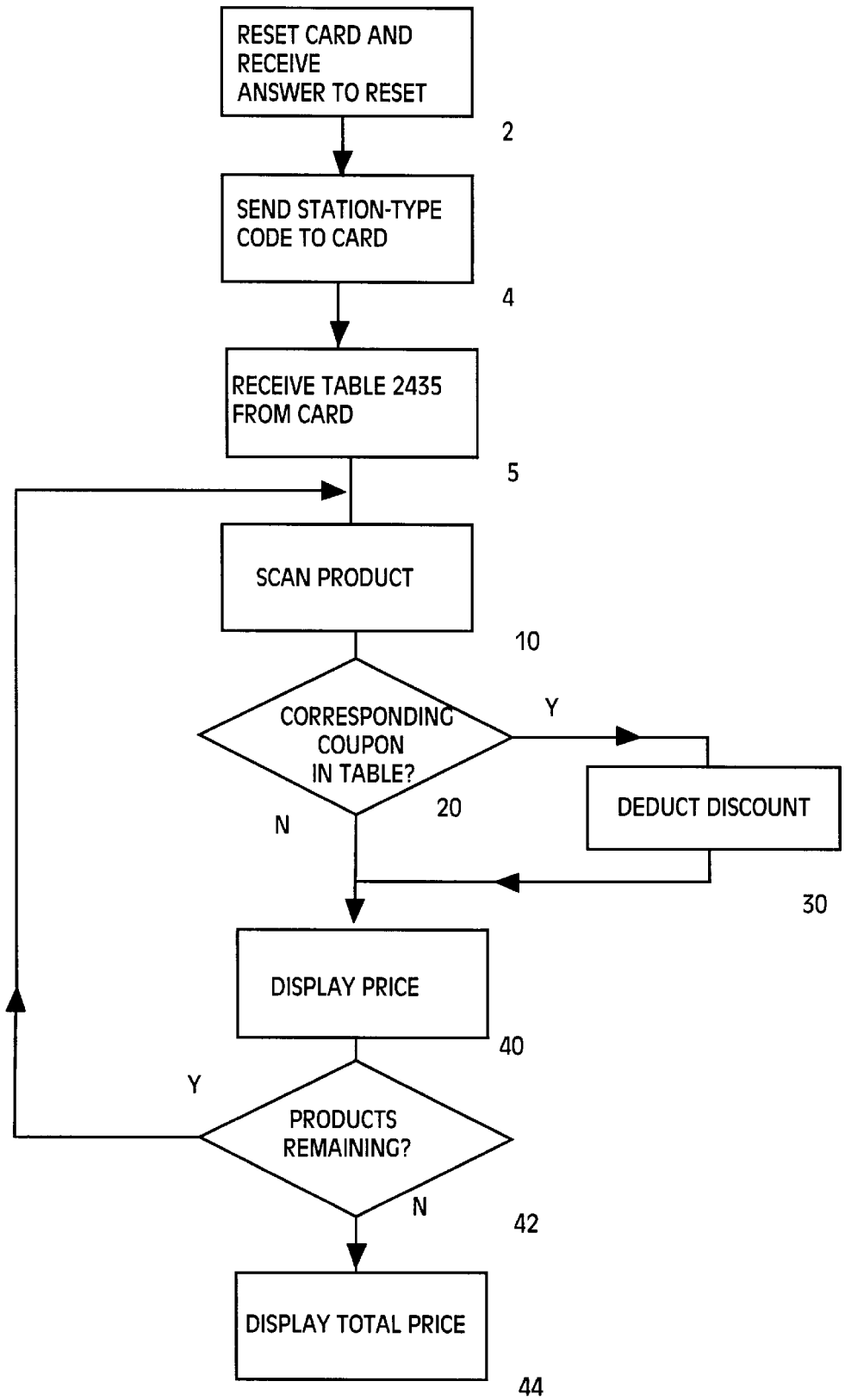
FIG. 15 is a flow chart of a processing performed by each checkout counter in the preferred system.

FIG. 15 shows step 65 of FIG. 12 in more detail. FIG. 15 shows a processing performed by CPU 950 and program 922 in checkout counter 900, when a customer checks out of store 1000. When a customer, such as customer 290, inserts customer card 295 into interface slot 914, a switch (not shown) in interface slot 914 alerts CPU 950 that a card has been inserted into the slot. When a customer card is in interface slot 914, conductive contacts (not shown) inside interface slot 914 touch each card contact 8420, thereby applying power from the interface to the card. Subsequently, CPU 950 causes card interface 925 to reset the card by applying a clock signal to card contact 8423. (If the card is a customer card, the card then answers the reset by sending a block of data, including identification data 8467 and authorization data 8468, through card contact 8427.) CPU 950 then receives the answer-to-reset from the card (step 2). CPU 950 then sends a data block containing a station-type code indicating a checkout station (step 4). CPU 950 then receives the contents of table 8435 in EEPROM 8462 of the customer card, and temporarily stores these table contents in memory 920 of the checkout station (step 5). During step 10005, CPU 950 also causes customer card 295 to remove all entries from list 8435, so that the electronic coupons in the list cannot be redeemed again. When the checkout clerk (not shown) moves a product past UPC reader 910, UPC reader 910 detects the UPC code on the product and sends the UPC code to CPU 950 (step 10).

CPU 950 determines whether the product has a corresponding coupon in the received table. (step 20). In step 20, product corresponds to a coupon if the five-digit manufacturer ID in the UPC coupon code equals the five-digit manufacturer ID in the UPC coupon code, and the three-digit coupon family code for the product corresponds to the three-digit family code of the coupon. These two family codes correspond if they are equal or if the coupon family code is a summary code that matches certain digits of the products' coupon family code, as described more fully in the UPC coupon code guidelines manual, reprinted Octember 1994, from the Uniform Code Council, Inc., Dayton, Ohio.

If the product corresponds to a coupon, CPU 950 subtracts the discount, as determined by the discount data stored in the received table, from a product reference price read from disk 925 (step 30), and displays the resulting price of the product on display 917 (step 40).

In summary, after UPC barcode reader 910 scans a product, processor 950 determines eligibility for a discount. If a product qualifies, processor 950 displays the discounted price on display 917.

Figure 16:
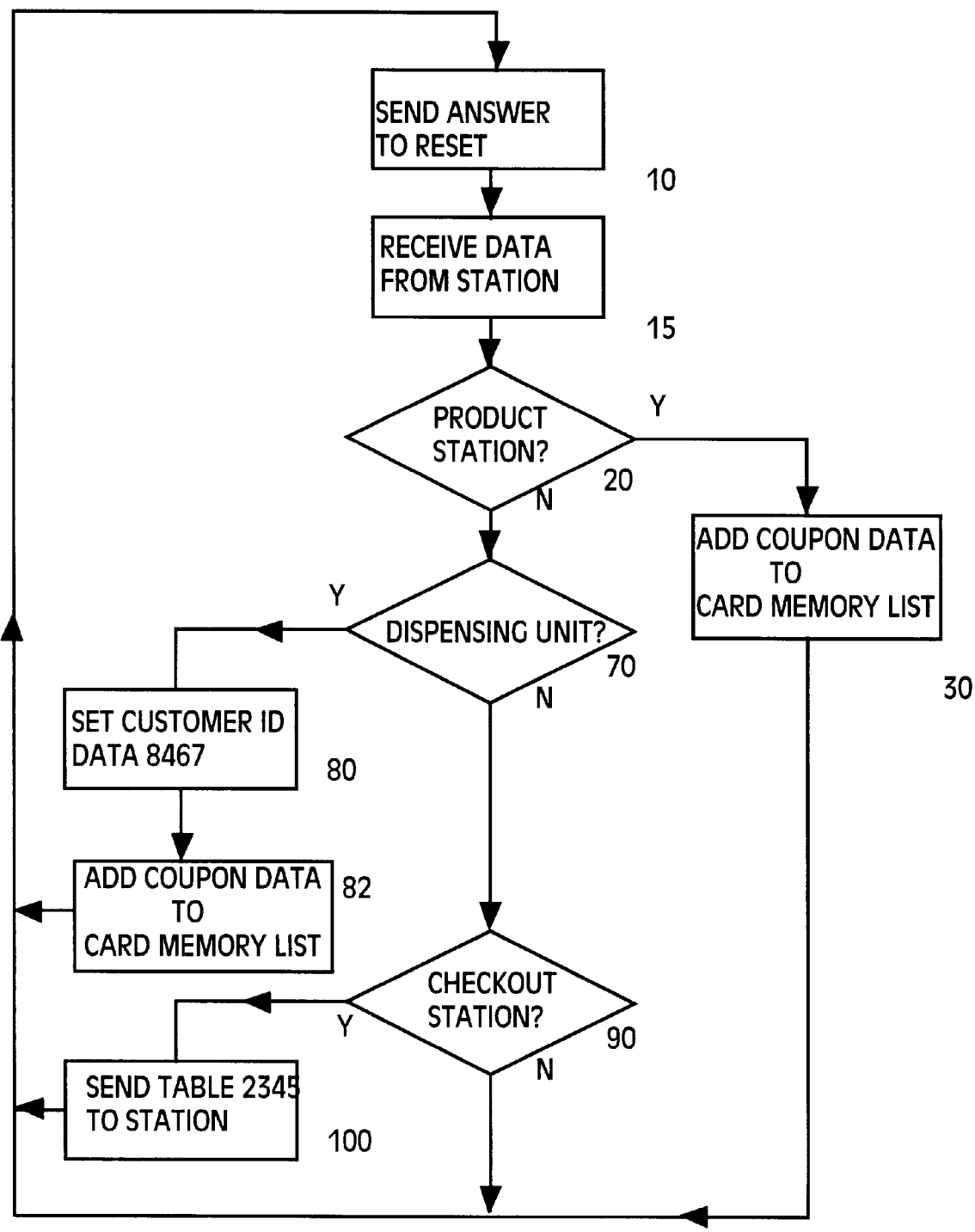
FIG. 16 is a flow chart showing a processing performed by each customer card in the preferred system.

FIG. 16 shows a processing performed by one of the customer cards, such as customer card 215, in the preferred retail system. After the card is reset through contacts 8420, the customer card sends an "answer to reset" data block in accordance with the ISO standard ISO/ICE 7816-3: 1989 (E), cited above. The customer card sends identification data 8467 and authorization data 8468 in the answer-to-reset data block (step 10). If the station then sends a block of data to the customer card, the customer card then receives the block of data through contact 8427 (step 15). If the block contains a station-type code indicating a product station (step 20), the customer card then adds product coupon information, from a certain location in the block, to the list 2345 (step 30).

If the customer card is not eligible, the station will not send a block of data, step 19015 therefore does not execute, and processing ceases until the customer card is reinserted into a station, at which time the station will reset the card and processing will restart at step 19010.

Alternatively, if the block contains a station-type code indicating a Checkout station (step 90), the customer card then sends list 2345 to the display kiosk (step 10). In other words, CPU 8450 reads list 8435 from EEPROM 8462, in response to a customer inserting card 215 into checkout station 915, and sends a signal corresponding to the list 2345 to the checkout station (step 100).

The communication protocol with a customer card is described in more detail in ISO/IEC 7816-3: 1989 (E), Identification cards—Integrated circuit(s) cards with contacts—Part 3: Electronic signals and transmission protocols; and ISO/IEC 7816-3: 1989/Amd.1: 1992 (E), Part 3: Electronic signals and transmission protocols, AMENDMENT 1: Protocol type T=1, synchronous half duplex block transmission protocol. Both of these standards are promulgated by the International Organization for Standardization (ISO) and distributed by the American National Standards Institute (ANSI).

Figure 17:
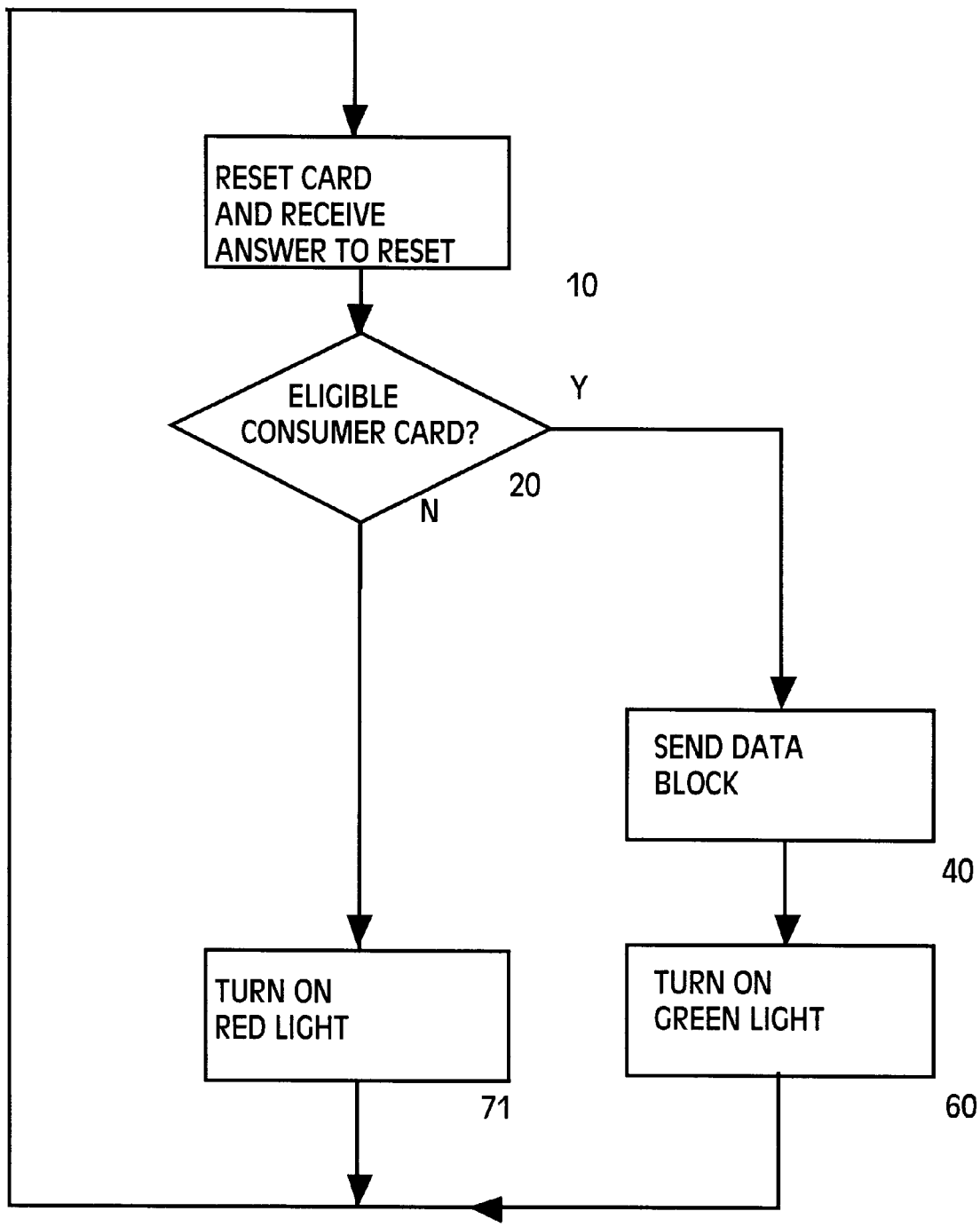
FIG. 17 is a flow chart of a coupon-dispensing processing performed by each product station in the preferred system.

FIG. 17 shows aspects of step 75 of FIG. 12 in more detail. FIG. 17 shows a processing performed by a processor and program in each product station. When a person inserts a card into an interface slot in the product station, conductive contacts (not shown) inside the interface slot touch each card contact 8420, thereby applying power from the product station to the card. A switch (not shown) alerts the processor that a card has been inserted into the slot. Subsequently, the processor resets the card by applying a clock signal to contact 8423. (If the card is a customer card, the card then answers the reset by sending a block of data, including identification data 8467 and authorization data 8468, through card contact 8427. Authorization data 8468 contains a card-type code indicating a customer card. The processor then receives the answer-to-reset data block from the card (step 10).

The product station processor analyzes the authorization data in the received answer-to-reset block to determine whether the card is a customer card that is eligible to receive paperless coupons in store 1000 (step 20). The processor determines that the card is a customer card if the received authorization data contains a card-type code indicating a customer card. If the card is a customer card, meaning that the authorization data is authorization data 2468, the processor determines if the card is eligible to receive paperless coupons in store 1000 if authorization data 2468 contains a store code indicating store 1000, and the current time and date (as indicated by a date-time clock inside the processor) is not later than the date data in authorization data 2468. If the card is an eligible customer card, the processor sends to the customer card a block containing a station-type code indicating a product station, and product coupon data from a memory in the product station (step 40). This coupon data is in the format described above in connection with FIG. 8. The processor then turns on a green light (not shown) on the product station to indicate to the customer that an electronic coupon has successfully been transferred to her customer card (step 60), thereby allowing the customer to conveniently verify whether she is eligible for a discount before selecting the product.

Additional features for a product station are described in Applicant's copending U.S. patent application of KEN R. POWELL for RETAIL SYSTEM, Ser. No. 08/468,816, filed Jun. 6, 1995, the contents of which is herein incorporated by reference.

Figure 18:
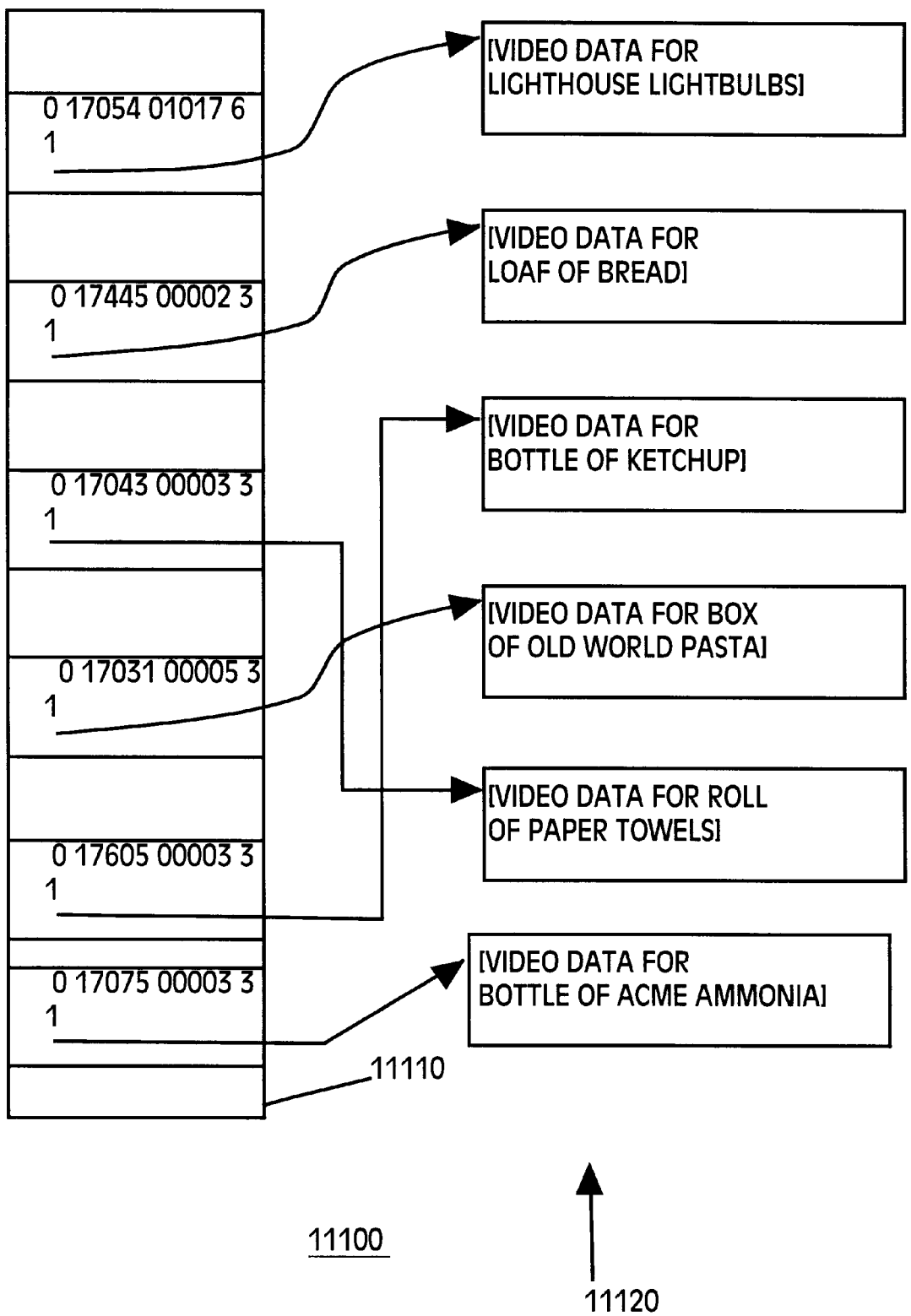
FIG. 18 is a diagram showing data structures for storing product image data in the card-dispensing kiosk.

FIG. 18 shows some data structures normally residing on CD-ROM 1737. Structure 11100 includes UPC table 11110. Each entry in table 11110 includes a pointer to video data 11120 for the product corresponding to the entry. Video data 11120 is a group of records each containing pixel data for a respective product. CPU 1750 uses the pointer to access a selected record of pixel data 11120.

During processing by CPU 1750, various parts of data structure 11100 may be automatically brought into memory 1720 with a virtual memory mapping, as is well known in the art.

Thus, memory 1720 and optical disk drive 1735, together act to store product image signals.

Figure 19:
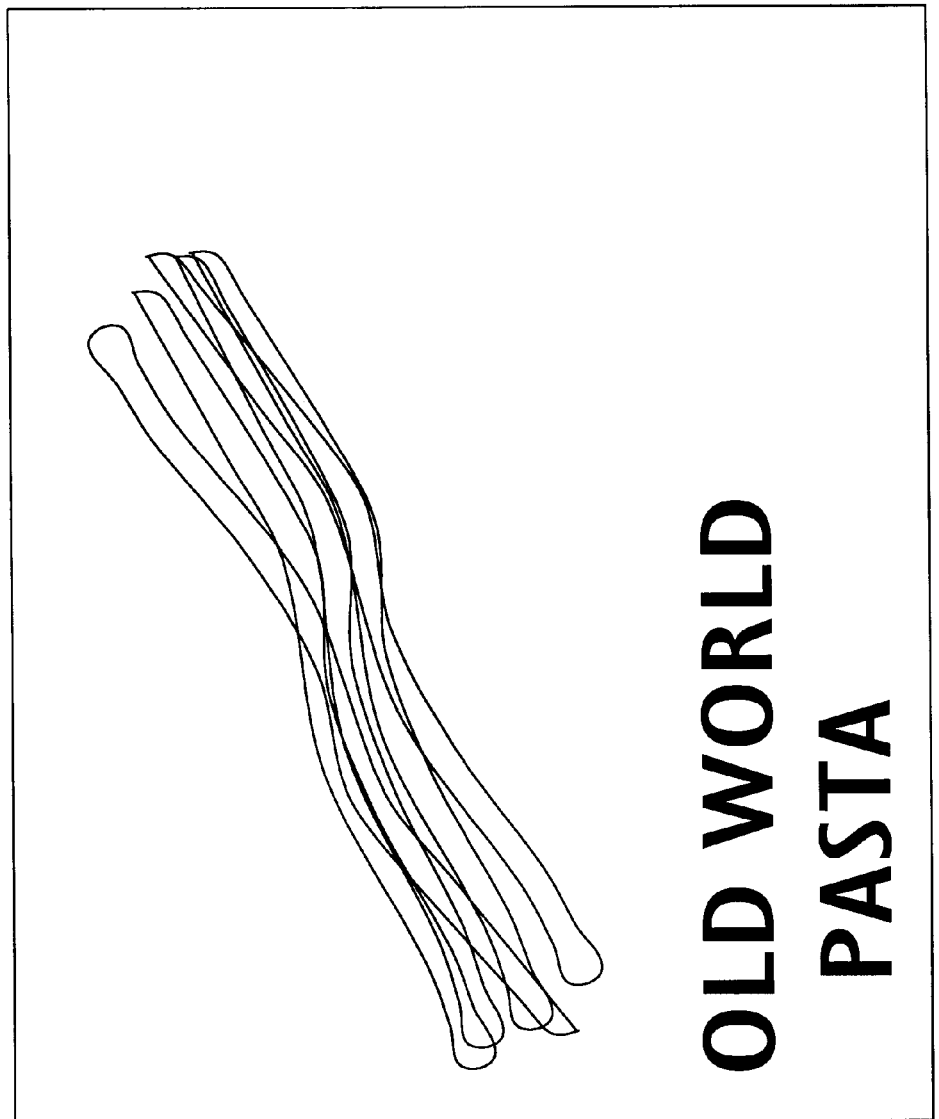
FIG. 19 shows an icon, shown in FIG. 9, in more detail.

FIG. 19 shows icon 1704 of FIG. 9 in more detail. The image shown in FIG. 19 is a reflection of pixel data 11120 depicted in FIG. 18.

After coupon redemption data, including customer identification data from a plurality of cards, is compiled and sent to a marketing research center the research center uses the customer identification data to access the corresponding demographic data, thereby providing manufacturers with marketing data on coupon program effectiveness and customer demographics. An example of such marketing data processing is described in Applicant's copending U.S. patent application of KEN R. POWELL for RETAIL SYSTEM, Ser. No. 08/468,816, filed Jun. 6, 1995, the contents of which is herein incorporated by reference. A computer network for sending data to a market research center is described in Applicant's copending U.S. patent application of KEN R. POWELL for COMPUTER NETWORK FOR A RETAIL SYSTEM, Ser. No. 08/799,688, filed Feb. 11, 1997, the contents of which is herein incorporated by reference.

Another kiosk for displaying product information is described in copending application of KEN R. POWELL for SYSTEM AND METHOD FOR DISPLAYING PRODUCT INFORMATION IN A RETAIL SYSTEM, Ser. No. 08/603,483 filed on Feb. 20, 1996, the contents of which is herein incorporated by reference.

Although the illustrated systems employ the UPC coupon code format, other formats maybe accommodated, such as the UCC/EAN-128 coupon extended code, documented in the UPC coupon code guidelines manual, reprinted, October 1994, from the Uniform Code Council, Inc., Dayton, Ohio.

Although the illustrated cards have been shown with a relatively simple memory organization, more involved memory organizations are possible, allowing a single card to function in other applications in addition to functioning in an embodiment of the invention.

Although the illustrated kiosk writes a respective card identifier (customer ID data 8467) onto each card before ejecting the card, the blank cards in card storage stack 1732 may come with a card identifier already written onto the card. In this alternative configuration, before the kiosk ejects the card, the kiosk would read this pre-written card identifier and store this identifier in association with data characterizing the customer. In this alternative configuration, the data characterizing the customer could include the customer's social security number, or some other data allowing the customer data compiled by kiosk 1700 to be associated with data in other databases exterior to kiosk 1700.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A system comprising:
   plurality of products;
   a kiosk including
      a card holder for concurrently holding a plurality of portable cards each having a random access memory (RAM),
      a receiver that receives a first signal characterizing a customer,
      a mechanism for ejecting a first card from the kiosk, the first card storing a respective second signal, and
      a memory that stores an association between the first signal and the second signal; and
   a checkout area including
      a card reader that receives a plurality of third signals from the RAM of the first card, each third signal corresponding to a product,
      a product detector that receives a fourth signal corresponding to a product, and a price determiner that determines a price depending on whether the fourth signal corresponds to one of the received third signals, wherein the kiosk further includes a writer that writes one of the third signals into the RAM of the first card, and the system further includes a second writer that writes one of the third signals into the RAM of a card ejected from the kiosk, the second writer being removed from the kiosk.

2. The system of claim 1 wherein the receiver includes a keyboard.

3. The system of claim 1 wherein the receiver includes an interface for receiving the first signal from another card.

4. The system of claim 1 wherein the kiosk further includes a sender that sends the respective second signal to the first card.

5. In a system including a plurality of products, a kiosk, and a checkout area, a method of operating the system comprising the steps, performed in the kiosk, of concurrently holding a plurality of cards each having a random access memory (RAM), receiving a first signal characterizing a customer;

ejecting a card in the plurality of cards from the kiosk, the ejected card storing a respective second signal; and storing an association between the first signal and the second signal, and the steps, performed in the checkout area, of:

receiving a plurality of third signals from the RAM of the ejected card, each third signal corresponding to a product;

receiving a fourth signal corresponding to a product; and determining a price depending on whether the fourth signal corresponds to one of the received third signals, wherein the method further includes the step, performed in the kiosk, of writing one of the third signals into the RAM of the card, and the step, performed outside of the kiosk, of writing one of the third signals into the RAM of a card ejected from the kiosk.

6. The method of claim 5 wherein the step of receiving a first signal includes receiving the first signal from a keyboard.

7. The method of claim 5 wherein the step of receiving a first signal includes receiving the first signal from another card.

8. The method of claim 5 further including the step, performed in the kiosk, of sending the respective second signal to the card.

* * * * *